Nov. 10, 1936.  E. R. KNIGHT  2,060,734
COMBINED LOCKING AND RELEASING ASSEMBLY
Filed March 21, 1934

Inventor
Edward R. Knight

By Geo. P. Kimmel
Attorney

Patented Nov. 10, 1936

2,060,734

UNITED STATES PATENT OFFICE 2,060,734

COMBINED LOCKING AND RELEASING ASSEMBLY

Edward R. Knight, Jefferson City, Mo., assignor of two-thirds to Edna T. Kuehn, one-sixth to William B. Raez, and one-sixth to Eda Mast, all of St. Joseph, Mo.

Application March 21, 1934, Serial No. 716,711

7 Claims. (Cl. 70—46)

This invention relates to a combined locking and releasing assembly for a door latching or locking element, and is designed primarily for use in connection with the latching means of automobile doors, but it is to be understood that the assembly, in accordance with this invention may be employed in any connection for which it is found applicable.

The invention has for its object to provide, in a manner as hereinafter set forth, an assembly of the class referred to including a revoluble mechanism having as a part thereof, an inwardly and outwardly movable key-releasable spring controlled means latched in position when moved inwardly to prevent the operation of a door latching or locking element to released position on the revolving of said mechanism, and latched, in position when moved outwardly to provide, on the revolving of the mechanism for the shifting of the door latching or locking element to released position to permit of the opening of the door from the exterior of the latter.

Further objects of the invention are to provide, in a manner as hereinafter set forth, an assembly for the purpose set forth which is comparatively simple in its construction and arrangement, strong, durable, compact, thoroughly efficient for the purpose intended thereby, readily installed with respect to a latching or locking element, and comparatively inexpensive to manufacture.

To the above ends essentially, and to others which may hereinafter appear the invention consists of such parts, and such combination of parts which fall within the scope of the invention as claimed.

The combined locking and releasing assembly is illustrated by way of example in connection with the actuating cam of a latching device for the door of an automobile.

In the drawing:—

Figure 1:
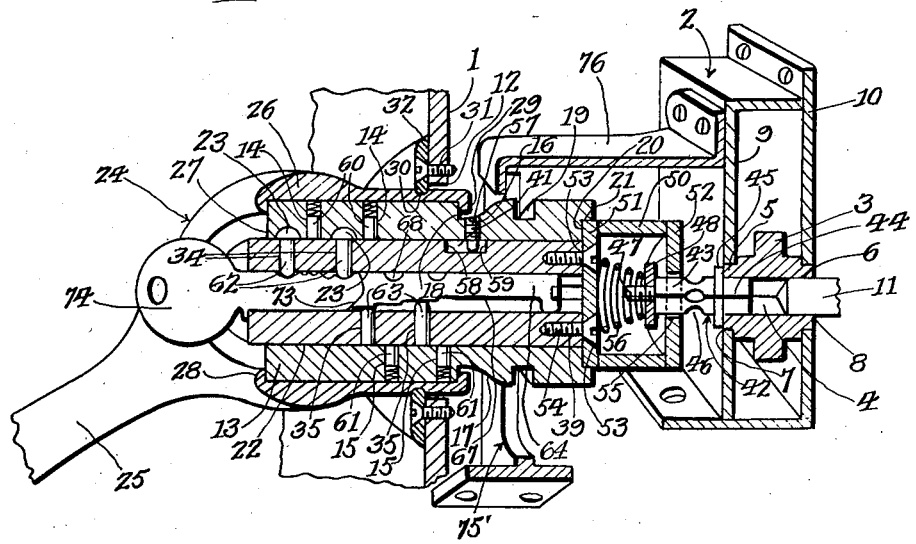
Figure 1 is a longitudinal sectional view of the assembly showing the adaptation thereof in connection with a latch cam of an automobile door latching device, and with the assembly in released position just prior to the expelling of its releasing key therefrom.
Figure 2:
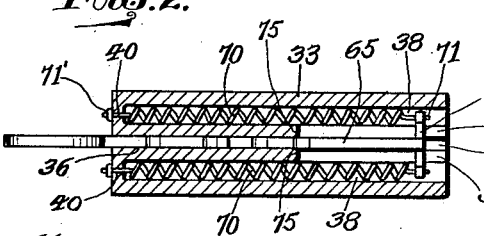
Figure 2 is a longitudinal sectional view, taken at right angles to Figure 1 of the cylinder of the assembly, and further illustrating the releasing key and the spring controlled shiftable tumbler setting and key expelling element when the assembly is shifted to released position.
Figure 3:
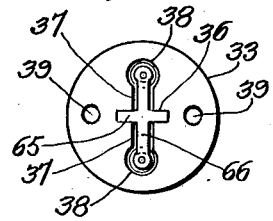
Figure 3 is an elevation of the inner end of the structure shown in Figure 2.

In the drawing, 1 indicates the front of the door of an automobile body and 2, a housing for a latching device. The housing is to be anchored in the door. Within housing 2 is an actuating cam 3 for a latching member, not shown. Cam 3 has a polygonal shaped axial bore 4. Registering with the latter is a pair of oppositely extending hollow stub shafts 5, 6 journaled in openings 7, 8, respectively formed in the walls 9, 10 respectively of housing 2. The inner face of the shafts 5, 6 correspond in contour to and register with the wall of the bore 4. Extending from stub shaft 6 is a handle member 11 to provide for the operation of the latching device from the interior of the body of the automobile. The front 1 of the door is formed with an opening 12 of materially greater diameter than and disposed concentrically with respect to openings 7, 8. The foregoing features are of known construction.

The combined locking and releasing assembly for the latching device includes a tubular casing 13 provided with an outer pair of spaced parallel radically disposed openings 14 at one side of its body and an inner pair of spaced parallel radially disposed openings 15 at the opposite side of its body. The openings 14 are spaced outwardly with respect to the openings 15. The opposite side of the body of casing 13, inwardly of the openings 15 and spaced from the inner opening 14, is formed with a radially disposed opening 16 having a threaded wall. The periphery of casing 13 is cut out to provide an annular groove 17. The outer end of opening 16 is positioned at the base of groove 17. The latter has a flat side wall 18 positioned in proximity to opening 16 and which constitute a shoulder. The periphery of casing 13 inwardly of the groove 17 is formed with an annular groove 19 of square cross section. The inner end of casing 13 is rabbeted to provide a seat 20 and a shoulder 21. The inner face 22 of casing 13 between the openings 14 and adjacent the outer opening 14 is formed with a pair of pockets 23.

The assembly includes a handle structure 24 which is secured to casing 13 for bodily revolving it. The structure 24 consists of handle means 25 formed integral at its inner end with a sleeve 26. The latter encompasses the casing 13 from the outer end edge 27 of the latter to the wall 18. The sleeve 26 has inwardly extending end flanges 28, 29, the former abutting the edge 27 and the latter the wall 18. The sleeve 26 is crimped to casing 13, extends through opening 12 and is formed in proximity to its inner end with a peripheral annular groove 30. Anchored to the front 1, by the holdfast means 31 is a collar 32, which seats in groove 30 and revolubly supports, as well as couples the structure 24 to front 1 of the door.

Arranged within the casing 13 is an outwardly and inwardly slidable cylinder 33 provided with an outer pair of spaced parallel radially disposed openings 34 at one side of its body adapted to register, when cylinder 33 is in its outer and inner positions respectively with the pockets 23 and openings 14. The opposite side of the body of cylinder 33, inwardly of the openings 34, is formed with an inner pair of spaced radially disposed openings 35, adapted to register with the openings 15 when cylinder 33 is in its inner position. The openings 34 are spaced outwardly with respect to openings 35. The cylinder 33 is formed with a lengthwise extending diametrically disposed central slot 36 extending from end to end thereof; a pair of oppositely disposed rectangular guide openings 37 communicating at their inner sides with the slot 36 adjacent the ends of the side walls of the latter; and a pair of parallel spaced sockets 38 lengthwise thereof. The openings 37 extend from the inner end of cylinder 33 to the transverse center of the latter and communicate at their outer sides with the inner sides of the sockets 38. The latter extend from a point adjacent the outer end and terminate at the inner end of cylinder 33. Formed in the inner end of cylinder 33 is a pair of diametrically opposed threaded sockets 39 for a purpose to be referred to. The outer end of cylinder 33 has a pair of diametrically opposed openings 40 for a purpose to be referred to and which communicate with the bases of the sockets 38. The cylinder 33 is formed in its periphery with a lengthwise extending rectangular cavity 41 for a purpose to be referred to and which is arranged rearwardly of the openings 35.

The operating shaft 42 for the actuating cam 3 for the latching member, not shown, comprises end sections 43, 44 and an intermediate section 45. The sections are of polygonal contour and correspond in contour to that of bore 4. The intermediate section 45 is of less length, but of greater width than the other sections and seats against the outer face of wall 9 of housing 2. The end section 44 extends through shaft 5 into bore 4, as well as snugly fits the wall of bore 4 and inner face of shaft 5. The section 44 is of less length than that of section 43. The latter intermediate its ends and in proximity to section 45 has a portion of each corner thereof dished out, as at 46 to provide a clearance for a purpose to be referred to. The free end of section 43 has extended therefrom, as well as disposed axially thereof a peripherally threaded stem 47 upon which is secured an abutment in the form of a nut 48 of greater width than and which abuts the free end edge of section 43. An operating element 49 is provided for the shaft 42 and which is carried by the inner end of cylinder 33. The said element 49 abuts the seat 20 and is surrounded by the shoulder 21 on the inner end of casing 13 when the cylinder 33 is at its outer position, but is shifted clear of the seat 20 and shoulder 21 when the cylinder 33 is moved inwardly. The element 49 comprises an annular body part 50 closed at its ends by the head pieces 51, 52 suitably secured to body part 50, preferably by welding. The head piece 51 is formed diametrically thereof with a pair of spaced tapered openings 53. Extending through the latter, as well as countersunk therein are holdfast means 54 which threadedly engage the walls of sockets 39 for fixedly securing element 49 against the inner end of cylinder 33. The head piece 52 axially thereof is formed with a polygonal shaped opening 55 corresponding in contour to that and encompassing section 43 of the shaft 42. Surrounding and extending from the stem 47 is a coiled controlling spring 56 for the cylinder 33 and element 49 which is interposed between nut 48 and the inner face of head piece 51. When element 49 is in the position shown in Figure 1 and cylinder 33 is revolved from casing 13, due to a coupling connection between the cylinder and casing, the element 49 will be carried with cylinder 33, and the walls of opening 55 in head piece 52 will engage with the side faces of stretch 43, thereby operating shaft 42 to provide for the actuation of cam 3 in a direction to move the latching member, not shown, to released position to permit of the opening of the door. Now it will be assumed that the cylinder 33 has been shifted inwardly and which will carry the element 49 therewith. The inward movement of the cylinder will be to an extent to position the walls of the opening 55 in head piece 52 to oppose in spaced relation the dished out portions 46 of the section 43 of shaft 42. When the element 49 is in the position just stated, it may be revolved with cylinder 33 and casing 13, but the walls of opening 55 will not coact with the stretch 43 to operate shaft 42. This provision is accomplished by the dished out portions 46 forming a clearance for the walls of opening 55. When the element 49 is shifted to have the walls of opening 55 oppose in spaced relation the dished out portions 46, the assembly is in its locking position, because cam 3 cannot be actuated from the exterior of the body of the automobile. When the element 49 is shifted to the position shown in Figure 1, the assembly is in released position, because cam 3 may then be actuated.

The assembly includes means for coupling casing 13 to cylinder 33 to provide for them revolving in unison, and means for locking and latching the element 49 respectively in non-actuating and actuating positions with respect to shaft 42.

The means for coupling casing 13 and cylinder 33 together consists of a threaded stud 57 coacting with the cavity 41. The stud 57 is secured to the wall of opening 16 and extends into cavity 41. The outer end wall 58 of cavity 41 constitutes a stop for the inward movement of cylinder 33. The inner end wall 59 of cavity 41 constitutes a stop for outward movement of cylinder 33.

The means for locking and latching element 49 respectively in non-actuating and actuating positions with respect to shaft 43 consists of spring controlled plungers 60 slidably mounted in the openings 14; spring controlled plungers 61 slidably mounted in the openings 15; slidable tumblers 62 mounted in the openings 34; and tumblers 63 slidably mounted in the openings 35. When element 49 is locked in its non-actuating position, with respect to shaft 42 (Figure 4), the tumblers 62, 63 align respectively with the plungers 60, 61 whereby the controlling springs of the plungers will force the latter into the openings 34, 35 moving the tumblers inwardly, and releasably locking casing 13 and cylinder 33 together whereby the latter will be prevented from shifting lengthwise of the sleeve 13 and element 49 will be held in the position shown in Figure 4. When the element 49 is latched in its actuating position, with respect to shaft 42, the plungers and tumblers will be in the position as shown in Figure 1, but the inner ends of the tumblers will be engaged in a spring controlled shiftable tumbler setting and key expelling element 64, now to be referred to.

The element 64 is in the form of an oblong slide 65 standing on its lower lengthwise edge and shiftably mounted within the slot 36 of the cylinder 33. The length of slide 65 is of less length than that of slot 36. The rear end of slide 65 carries a cross head 66 which operates in the openings 37 and sockets 38. The bottom edge of slide 65 has a lengthwise extending cutout 67 to form an elongated notch for the reception of the inner ends of the tumblers 63. The top edge of slide 65 is also formed with seats 68 for the inner ends of tumblers 62. The bottom edge of slide 65 is formed with a pair of superposed steps or abutments 69 for the inner ends of the tumblers 63. Mounted in the sockets 38 are controlling springs 70 for the slide 65, and which are anchored at one end, as at 71 to cross head 66. The other ends of springs 70 extend through the openings 40 and are anchored to cylinder 33, as at 71'. The outer end edge 72 of slide 65 is of an angled contour and oppositely disposed with respect to the angled contour of the outer end edge 73 of a releasing key 74.

The normal position of element 64 is that the cross head 66 is positioned against the inner walls 75 of the openings 37, and the outer end edge 72 of slide 65 arranged at the outer end of the cylinder 33. When element 64 is in normal position, the seats 69 are arranged to receive the inner ends of the tumblers 62 and the cutout 67 is arranged to receive the inner ends of the tumblers 63. When slide 65 is in its normal position the tumblers 62, 63 are out of alignment with the plungers 60, 61 respectively. The foregoing arrangement is provided for by the normal position of cylinder 33 relative to casing 13 as in such position the outer end of the cylinder 33 is extended beyond the outer end of casing 13, as is shown in Figure 1.

Figures 4, 5, 6:
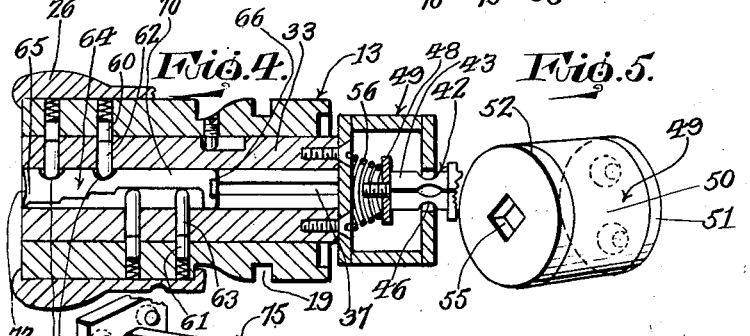
Figure 4 is a fragmentary view in longitudinal section showing the assembly in locking position.
Figure 5 is a perspective view of the operating element for the shaft shown in Figure 1.
Figure 6 is a sectional detail of the tubular casing.
Figure 7:
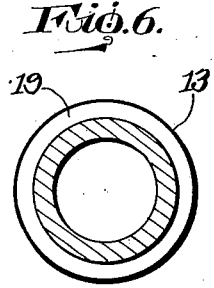
Figure 7 is a perspective view of the supporting element of the assembly.

When element 49 is in actuating position with respect to shaft 42, such position being the releasing position of the assembly, and it is desired to move the element 49 to its non-actuating position with respect to shaft 42, such latter position being the locking position of the assembly, the cylinder 33 is moved inwardly from its normal position to an extent to position the wall of opening 55 of element 46 to surround, in spaced relation the dished out portion 46 of shaft 42. The cylinder 33 when shifted inwardly will cause the tumblers to align with the plungers whereby the tumblers and plungers will coact to lock cylinder 33 to casing 13 and the assembly will appear as shown in Figure 4. The inward shift of cylinder 33 is had against the action of the controlling spring 56 arranged in element 46. Now to release the assembly to permit of the operation of shaft 42 from element 46, the key 74 is inserted in slot 37 for the purpose of forcing element 64 inwardly against the action of springs 70. The element 64 is moved by the key 74 to the position shown in Figure 1. The inward movement of element 64 acts to shift the tumblers outwardly which in turn will move the plungers clear of cylinder 33 thereby releasing the latter so that the spring 56 will act to move cylinder 33 and element 49 outwardly to the position shown in Figure 1. When pressure is relieved upon key 74, the springs 70 act in connection with the element 64 to expel the key from cylinder 33. When element 49 is in the position shown in Figure 1, and it is desired to operate shaft 42 the casing 13, cylinder 33 and element 49 are bodily revolved together from handle structure 24. When element 49 is in the position shown in Figure 4, casing 13, cylinder 33 and element 49 may be bodily revolved together from handle structure 24, but element 49 will revolve clear of shaft 42.

The assembly includes a yoke-shaped supporting element 75' which is anchored in the door and extends into the groove 19 at opposite sides of the casing 13. An angle-shaped retaining strap 76 is secured to the wall 9 of housing 2 and which overlaps the outer end of element 75' to maintain the latter rigid.

The slide 65 of the spring controlled shiftable tumbler and key expelling mechanism, when the assembly is in set position to prevent the operating of the actuating cam 3 for the latching member, is arranged in a manner to have its outer end at the outer end of the cylinder 33 whereby the slot 36 which constitutes the key hole opening is slugged from its outer end to prevent tampering with the assembly for the purpose of moving the latter to actuating position with respect to cam 3. Further when slide 65 is in the position aforesaid it will act to prevent foreign substances entering the assembly from the outer end of the key hole opening. The position aforesaid of the slide 65 will prevent water in cold weather dripping in and freezing up the elements of the assembly.

What I claim is:—

1. In a cylinder lock, a revoluble tubular casing, a shiftable outwardly or inwardly positioned spring controlled cylinder arranged within, slidably connected to and bodily revoluble with said casing, said cylinder when in its outer position extending outwardly beyond the outer end of the casing and when in its inner position extending beyond the inner end of the casing, an outwardly or inwardly positioned shiftable spring controlled slide arranged within, slidably connected to and bodily revoluble with said cylinder, said slide when in its outer position arranged in the outer portion of the cylinder and when in its inner position arranged within the inner portion of the cylinder, and said casing, cylinder and slide having releasable coacting means for normally latching the cylinder in its inner position and the slide in its outer position simultaneously.

2. In a cylinder lock, a shiftable outwardly or inwardly positioned spring controlled revoluble cylinder having diametrically extended openings, a shiftable outwardly or inwardly positioned slide within the cylinder and having a cross head at one end, said slide being of a length less than that of said cylinder, controlling springs for the slide within and anchored to the cylinder and anchored to said crosshead, and spring controlled slide releasable means arranged in said openings and extending into the slide for normally latching the cylinder in its inner position and the slide in its outer position.

3. In a cylinder lock, a revoluble tubular casing, a shiftable outwardly or inwardly positioned spring controlled structure arranged within, slidably connected to and bodily revolving with said casing, said structure being normally in its inward position extended from the inner end of said casing and having its outer end flush with the outer end of said casing, said structure when in its outer position having its outer end extended beyond the outer end of said casing and its inner end positioned nearer the inner end of the casing than when said structure is in normal position, a shiftable outwardly or inwardly positioned spring controlled slide within, slidably connected to and bodily revoluble with said cylinder, said slide when in its outward position being arranged in the outer portion of said structure and when in its inner position being arranged in the inner portion of said structure, said slide being of less length than that of said structure, and said casing, structure and slide carrying coacting releasable means for latching the casing, structure and slide together to releasably hold the cylinder in its inner position and the slide in its outer position.

4. In a cylinder lock, a revoluble casing, a normally inactive spring controlled releasable latch actuating structure arranged within, slidably connected to and bodily revoluble with said casing, said structure when released being slidable in an outward direction with respect to said casing to latch actuating position, a shiftable spring controlled element slidably mounted within, connected to and bodily revoluble with said structure, said element being normally positioned in the outer portion of said structure, and said casing, structure and element having releasable coacting means for normally locking said structure and element simultaneously in their normal position, said coacting means being releasable by and on the shifting of said element, against the action of its controlling spring in an inward direction within said structure whereby the latter will be moved by its controlling spring to latch actuating position.

5. In a cylinder lock, a slidable, revoluble, spring controlled normally locked cylinder formed with an axially arranged slot, a pair of guide openings communicating at their inner sides with said slot and a pair of parallel sockets adjacent said slot and communicating at their inner sides with said openings, said slot and sockets being of greater length than said opening, a combined locking and releasing slide for said cylinder, said slide being positioned within and of less length than that of said slot, a cross head at one end of said slide and travelling in said openings and sockets, and controlling springs within said sockets and anchored to said cross head and cylinder.

6. In a cylinder lock, a non-slidable revoluble latch releasing shaft having squared surfaces and a reduced part intermediate the ends of said surfaces, a revoluble structure outwardly adjacent said shaft and including a normally latched spring controlled element revolving therewith provided at its inner end with a polygonal shaped opening, said shaft permanently extending through said opening into said element, the walls of said opening coacting with said squared surfaces to provide for the revolving of the shaft from said structure, the walls of said opening normally opposing the reduced part of said shaft to prevent the revolving of the shaft by said walls, said walls on the release of said element coacting with said squared surfaces for revolving the shaft on the revolving of said structure, and the controlling spring of said element being arranged within the latter between a part of said element and said shaft.

7. In a cylinder lock, a non-slidable revoluble latch releasing shaft having squared surfaces and a reduced part intermediate the ends of said surfaces, a revoluble structure outwardly adjacent said shaft and including a normally latched spring controlled element revolving therewith provided at its inner end with a polygonal shaped opening, said shaft permanently extending through said opening into said element, the walls of said opening coacting with said squared surfaces to provide for the revolving of the shaft from said structure, the walls of said opening normally opposing the reduced part of said shaft to prevent the revolving of the shaft by said walls, said walls on the release of said element coacting with said squared surfaces for revolving the shaft on the revolving of said structure, an abutment within said element and carried by the shaft, and the controlling spring for said element being arranged within the latter and between a part of said element and said abutment.

EDWARD R. KNIGHT.